(12) United States Patent
Ording et al.

(10) Patent No.: US 7,263,914 B2
(45) Date of Patent: Sep. 4, 2007

(54) HIGH PERFORMANCE BICYCLE CRANK

(75) Inventors: Andrew Ording, Indianapolis, IN (US); Aaron Barker, Carmel, IN (US)

(73) Assignee: Compositech, Inc., Speedway, IN (US)

( * ) Notice: Subject to any disclaimer, the term of this patent is extended or adjusted under 35 U.S.C. 154(b) by 0 days.

(21) Appl. No.: 11/072,769

(22) Filed: Mar. 3, 2005

(65) Prior Publication Data

US 2005/0145061 A1    Jul. 7, 2005

Related U.S. Application Data

(63) Continuation of application No. 10/245,630, filed on Sep. 17, 2002, now abandoned.

(60) Provisional application No. 60/322,870, filed on Sep. 17, 2001.

(51) Int. Cl.
*G05G 1/14* (2006.01)

(52) U.S. Cl. .................................................. 74/594.1

(58) Field of Classification Search ..... 74/594.1–594.3
See application file for complete search history.

(56) References Cited

U.S. PATENT DOCUMENTS

| | | | |
|---|---|---|---|
| 4,811,626 A | 3/1989 | Bezin | 74/594.1 |
| 5,493,937 A | 2/1996 | Edwards | 74/594.1 |
| 5,632,940 A | 5/1997 | Whatley | 264/46.4 |
| 5,941,135 A | 8/1999 | Schlanger | 74/594.1 |
| 6,079,294 A | 6/2000 | Mizobe | 74/594.1 |
| 6,145,184 A | 11/2000 | Yamanaka | 29/527.6 |
| 6,202,506 B1 | 3/2001 | Storck et al. | 74/594.1 |
| 6,305,243 B1 | 10/2001 | Chiang | 74/594.1 |
| 6,314,834 B1 | 11/2001 | Smith et al. | 74/594.1 |
| 6,353,992 B1 | 3/2002 | Mizobe | 74/594.1 |
| 6,443,033 B1 | 9/2002 | Brummer et al. | 74/594.1 |
| 6,508,146 B2 | 1/2003 | Kang et al. | 74/594.1 |
| 6,543,308 B2 | 4/2003 | Harrington | 74/594.1 |
| 6,564,675 B1 | 5/2003 | Jiang | 74/594.1 |
| 2001/0049976 A1 | 12/2001 | Dodman | 74/594.1 |
| 2003/0019324 A1 | 1/2003 | Valle | 74/594.1 |
| 2003/0019325 A1 | 1/2003 | Valle | 74/594.1 |
| 2003/0037638 A1 | 2/2003 | Dal Pra' | 74/594.1 |
| 2003/0066383 A1 | 4/2003 | Jiang | 74/594.1 |

OTHER PUBLICATIONS

Ording and Mallaby, Sep. 8, 1999, a High Performance Bicycle Crank. Provisional Patent Application, describing cranks first sold in 1997 and 1999.

*Primary Examiner*—Chong H. Kim
(74) *Attorney, Agent, or Firm*—E. Victor Indiano; Indiano Vaughan LLP

(57) ABSTRACT

A carbon fiber bicycle crank includes an axle lug, having a portion for receiving a crank axle. A foam core is coupled to the axle lug during a first molding process. A pedal engaging lug is coupled to the foam core after the completion of the first molding process, and a carbon fiber composite material exoskeleton is coupled to and disposed exteriorly of the axle lug, foam core and pedal lug.

11 Claims, 6 Drawing Sheets

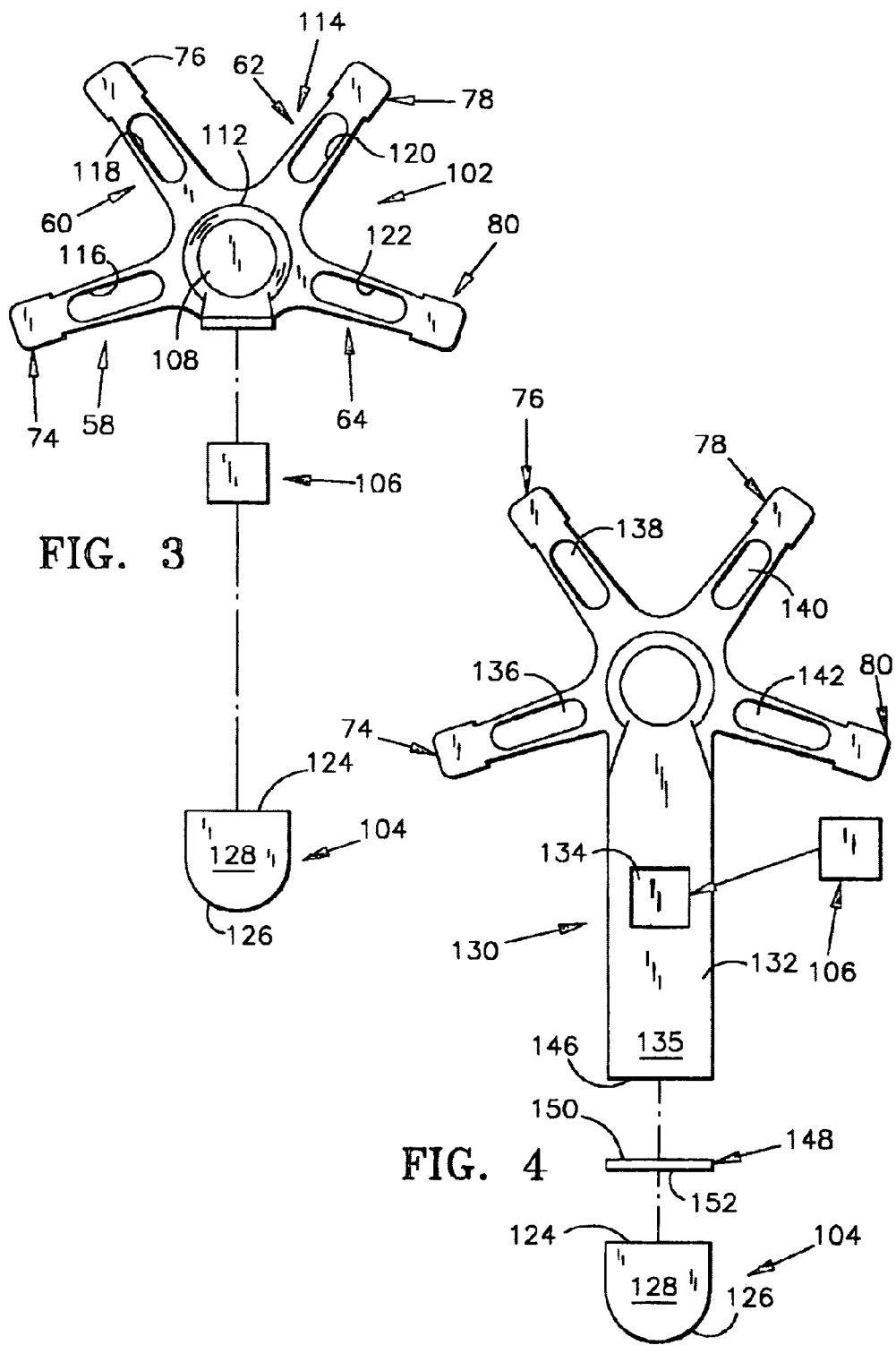

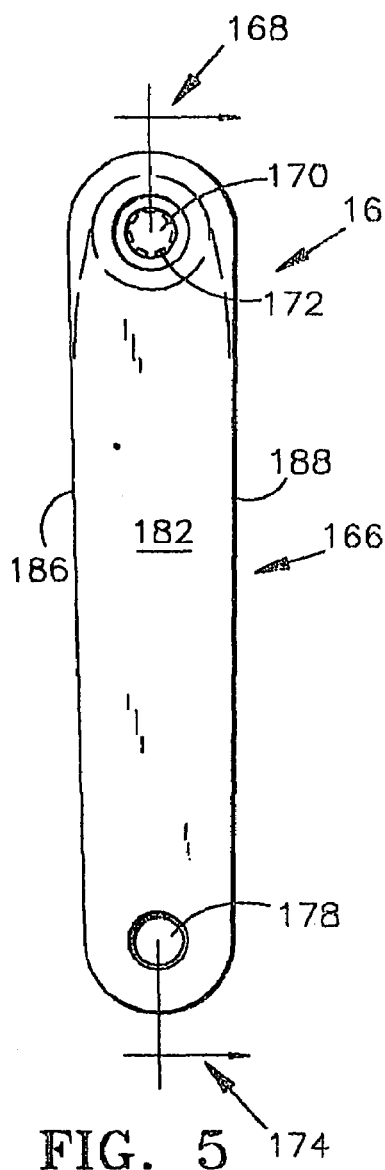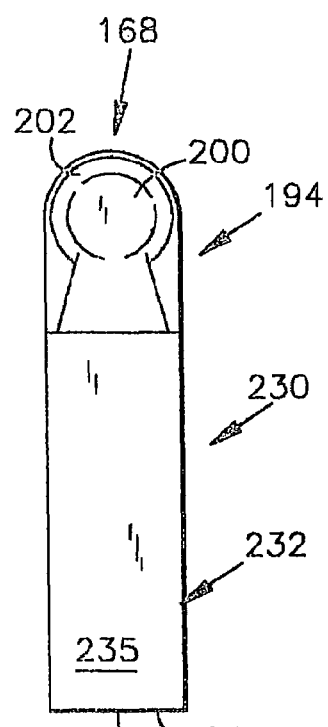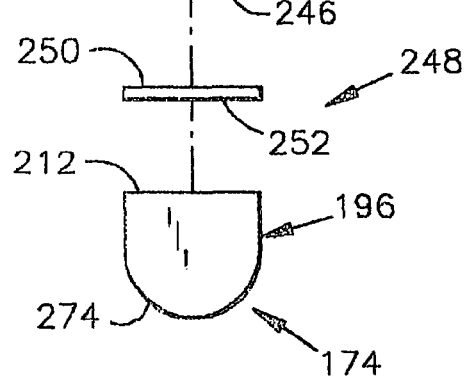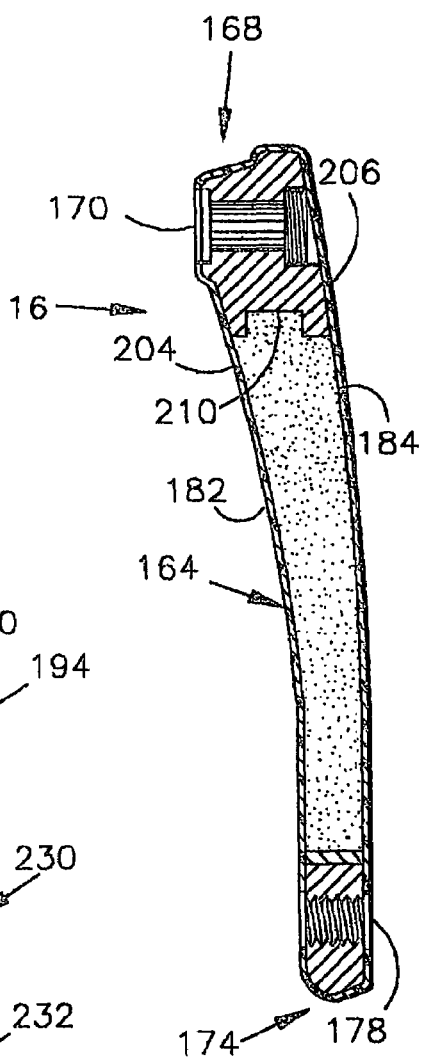
FIG. 5
FIG. 7
FIG. 6

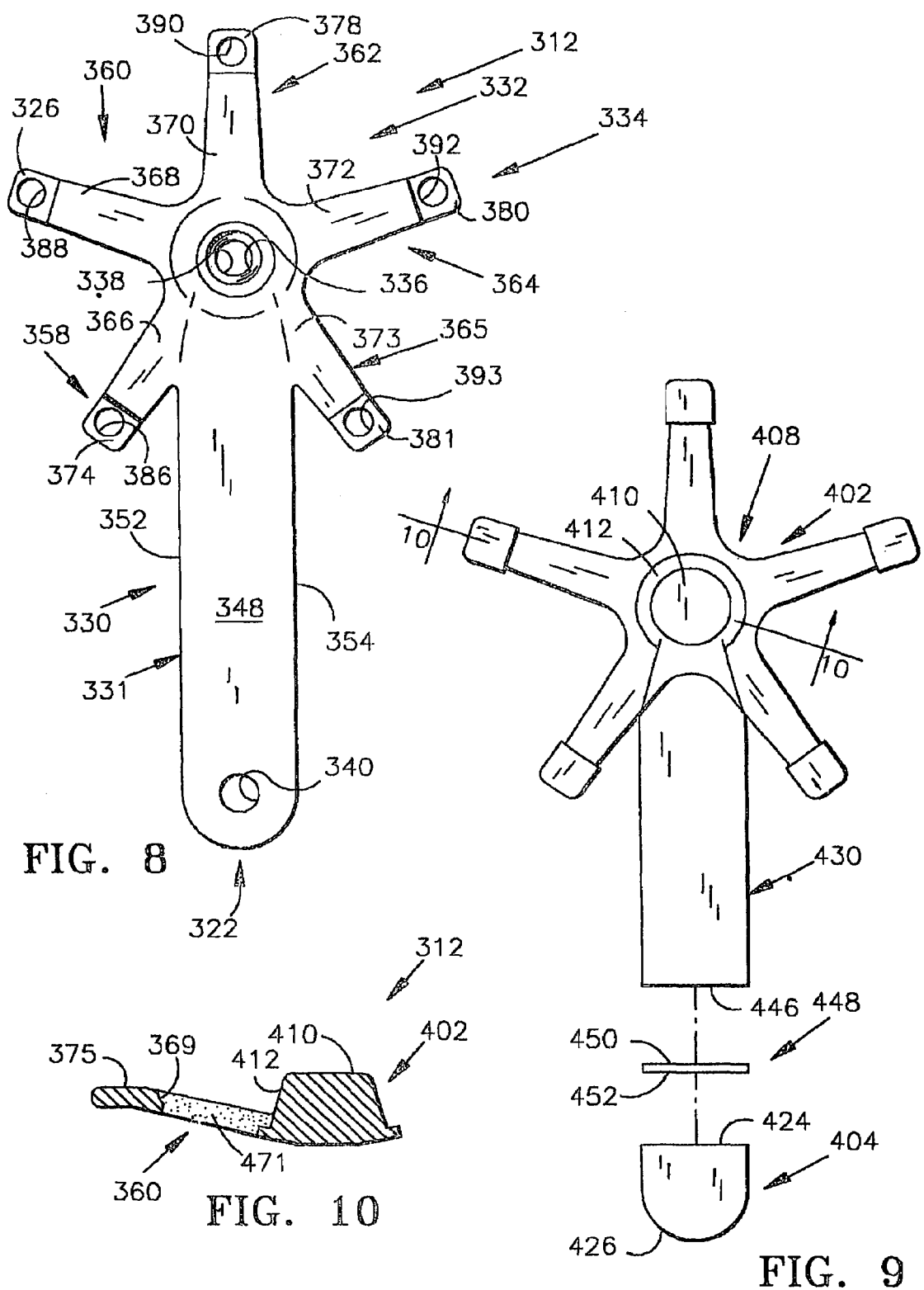

HIGH PERFORMANCE BICYCLE CRANK

I. STATEMENT OF PRIORITY

This utility patent application is a continuation of currently U.S. patent application Ser. No. 10/245,630, which was filed on 17 Sep. 2002, now abandoned and claims priority to U.S. Provisional Patent Application, Ser. No. 60/322,870, filed 17 Sep. 2001.

II. TECHNICAL FIELD

The present invention relates to bicycle cranks, and more particularly to carbon fiber bicycle cranks. The carbon fiber crank has improved strength over metal cranks and has a significantly lower weight.

III. BACKGROUND OF INVENTION

When an athlete first takes up a new sport she typically buys moderately priced equipment with decent performance characteristics. As her abilities improve she looks for ways to increase her performance and hence her competitiveness. Upgrading equipment is one method of increasing performance.

The vast majority of bicycles purchased are off-the-shelf bikes as opposed to custom bikes. A custom bike is created by buying individual components and assembling these components together into a complete bike. As a cyclist becomes more involved in the sport, it is typical for him to look to increase the performance of his bike. There are two ways to accomplish this goal. First, he can buy a whole new bike or maybe even create a new custom bike. Second, he can replace the "original equipment" components on his bike with higher performance custom or aftermarket components. For instance, a cyclist can replace his original equipment wheel with a lighter and higher strength model wheel such as the ZIPP 520 wheel.

Another bicycle component that impacts a bicycle's performance, and hence is often upgraded, is the bicycle's crank. The crank comprises the pair of arms which couple the bicycle's pedals to its chain ring.

There are four primary ways to increase the performance of a bike crank: (1) maximize power transfer from the rider to the wheel; (2) minimize weight; (3) reduce air resistance; and (4) increase reliability. Standard metal cranks are old in the art and have varying performance characteristics. Carbon fiber cranks are relatively new in the art and have far superior performance characteristics over metal cranks. Carbon fiber cranks are the state of the art in bicycle crank technology because they are stiff and light, and the fibers can be oriented in a direction to resist forces applied to the crank during cycling.

Most known "carbon fiber" cranks are not made entirely from carbon fibers. Rather, they often include one or more metal components along with carbon fiber components.

The material which makes up the carbon fiber component is usually comprised of a resin and carbon fiber composite material. The carbon fibers give the final crank added strength and stiffness that the resin by itself can not provide. Carbon fibers take on two distinct forms: chopped or continuous. In a chopped carbon fiber component, the fibers are relatively short in length and their orientation to each other is random. The presence of the chopped fibers increases the strength of the component. In a continuous carbon fiber component, the length of the fibers is relatively longer and their orientation to each other is structured. It is the structured orientation of the continuous carbon fibers that greatly increases the strength of the component. The continuous fibers can be oriented in a specified direction to better combat the effects of external loads imposed of a specific type, or from a specific direction.

Bicycle cranks are part of the transmission drive train of the bike. The cyclist exerts a load on the crank at the center of the pedal axis during a pedal stroke. This force varies between about 40 and 450 lbs depending on the riding conditions and strength of the rider. Initial pedaling, climbing or sprinting result in the greatest loads.

This force exerted by the cyclist when pedaling results in two types of deflections of the crank. The first type of deflection is a bending deflection that occurs about the bottom bracket in the connection point of the crank to the bike, in a plane parallel to the chain rings. This force is exerted generally in the direction of crank rotation. The second or torsional type of deflection is a twisting of the crank arm about an axis extending along the length of the arm from the pedal axis to the bottom bracket axis. The more the crank deflects torsionally, the less power is transferred from the rider to the wheel.

Compositech, Inc., the assignee of the instant invention, marketed the first continuous carbon fiber crank in the fall of 1997 under its ZIPP SPEED WEAPONRY trademark. The 1997 ZIPP crank is composed of three carbon fiber members. The first member is an elongated, generally ovaloid, hollow, continuous carbon fiber crank arm with a metal insert disposed at the distal (pedal) end and at the proximal (spindle) end. The distal end insert has a pedal receiving aperture and is over molded by the carbon fiber arm. The proximal end insert has a bottom bracket spindle receiving aperture and is secured to the carbon fiber arm with an adhesive material. The proximal insert is designed to couple the crank to a rectangular, 2° taper bottom bracket spindle. The proximal end of the carbon fiber arm receives a cap. The second carbon fiber member is a continuous carbon fiber spider that attaches the crank to the chain drive of the bike. The third carbon fiber member is a backing plate which secures the spider to the crank arm.

The 1997 ZIPP crank has several advantages over standard metal cranks. First, the hollow carbon fiber construction makes the crank significantly lighter than standard metal cranks. The 1997 ZIPP crank weighs only 350 grams. Second, the ovaloid shape of the arm is more aerodynamic than circular or generally rectangular cranks. Third, the 1997 ZIPP crank's ovaloid cross-section make the crank stronger than known metal cranks. Fourth, the continuous carbon fiber construction allows for the minimization of the rotational and torsional deflections the crank will experience during a pedal stroke. This optimization increases the life of the crank by reducing the amount of accumulative fatigue experienced. It also maximizes power transfer from the rider to the chain drive by reducing the bending and twisting deflections of the crank.

Although the 1997 ZIPP crank was the state of the art at the time of its creation, there was still room for improvement. One drawback with the 1997 ZIPP crank is its incompatibility with one of the more popular spline drive systems used on bicycles. Another drawback with the 1997 ZIPP crank is that it is difficult to manufacture, requiring the three separate components be molded out of carbon fiber, and then line welded to each other and bonded together. This process was labor-intensive and time consuming.

In order to overcome these difficulties, the assignee invented the 1999 ZIPP crank. The 1999 ZIPP crank includes a crank spider that is coupled to the second metal insert and bicycle chain drive, and a cap to cover the second end of the carbon fiber arm. The spider is replaced with a cover on the non-drive side crank. The drive side is defined as the side of the bicycle with the chain drive.

The 1999 ZIPP crank was manufactured by starting with a solid template whose shape generally matches the interior shape of the crank arm. The template serves as a base, around which uni-directional carbon fiber laminates are wound. Each laminate is wrapped around the template in succession culminating in the application of the outside or twill, carbon fiber laminate. At this point, the template is pulled out of the open second end of crank arm. The orientation of the carbon fibers is chosen to maximize the stiffness of the crank. The hollow interior significantly reduces the weight of the crank when compared to metal cranks.

A first insert is wrapped in a carbon fiber laminate and positioned in the interior of the crank arm at the first (distal) end. Upon curing the carbon laminates, the first insert is completely encapsulated by the crank arm at the first (distal) end.

After the resin has set, the crank arm is trimmed to its final length and a relief cut is made in the bottom bracket spindle facing surface of the crank arm at the second end. A second insert is then assembled to the crank arm by applying an adhesive to the interior surfaces of the crank arm at its second end, and inserting the second insert into the second end of the crank arm. A spider can then be attached to the second insert.

Notwithstanding the advantages obtained with the 1999 ZIPP crank (as compared with the 1997 ZIPP crank) room for improvement still exists. In particular, room for improvement exists in producing a crank design that is less time consuming to manufacture, and hence, is less expensive to produce, but which still retains the stiffness, aerodynamic properties, and light weight of the 1997 and 1999 ZIPP cranks.

One object of the present invention is to create a carbon fiber bicycle crank arm that maintains good weight, aerodynamic, and stiffness qualities, while being easier to manufacture than cranks heretofore known by the applicant.

IV SUMMARY OF THE INVENTION

In accordance with the present invention, a carbon fiber bicycle crank comprises an axle lug having a portion for receiving a spindle axle. A foam core is coupled to the axle lug during a first molding process. A pedal engaging lug is coupled to the foam core after the completion of the first molding process, and a carbon fiber composite material exoskeleton is coupled to and disposed exteriorly of the axle lug, foam core and pedal lug.

Preferably, the bicycle crank arm is made in a drive side version, that can be coupled to the chain ring of the bicycle, and a non-drive side version. The drive side crank arm preferably includes a spider portion that includes at least one radially extending arm having a distal end capable of being coupled to the chain ring of the bicycle.

In accordance with another aspect of the present invention, a method of manufacturing a carbon fiber bicycle crank arm is disclosed. This method includes providing an axle lug, and placing the axle lug in a mold cavity. A curable foam material is added to fill the mold cavity, to form a cured foam core that is coupled to the axle lug. A pedal engaging lug is attached to the foam core. The cured foam core, pedal lug, and axle lug are wrapped with a curable composite resin material. After wrapping, the curable resin material is cured to form a carbon fiber material exoskeleton of the bicycle crank arm.

Preferably, this method includes the step of machining an axle receiving bore through the axle lug, and machining a pedal axle receiving bore through the pedal lug. The axle receiving bore is capable of receiving the bicycle crank (spindle) axle, and the pedal axle is capable of receiving a pedal axle.

In a most preferred embodiment, a pair of sheets of the curable carbon fiber material are provided, that are used to wrap the cured foam core, axle lug and pedal lug. The joined axle lug foam core, and pedal lug are placed between the pair of sheets of curable carbon fiber material. Heat and pressure applied to the pair of sheets to foam an exoskeleton having a shape defined by the axle lug, foam core and pedal lug.

One feature of the present invention is that it incorporates a curable foam material. This feature has the advantage of providing a foam around which the uncured carbon fiber sheets can be wrapped for giving form and shape to the carbon fiber exoskeleton. This form giving quality is achieved by the foam at a very low material cost, and with a very low addition of weight.

Another feature of the present invention is that a pedal lug is added to the foam core after the first molding process. This feature has the advantage of enabling the pedal lug to be joined to the foam core quite easily, while removing the design constraints inherent in prior systems that joined a pedal lug to a foam core in a unitary molding process.

These and other features of the present invention will be apparent skilled in the art upon careful review of the detailed description provided below in conjunction with the following drawings.

V. BRIEF DESCRIPTION OF THE DRAWINGS

FIG. 3 is an exploded view of the spindle facing surface of an axle lug, pedal lug, and fifth hole lug of a drive side crank of the present invention;

FIG. 4 is an exploded view of the spindle facing surface of the drive side crank components of the present invention, prior to the application of the carbon fiber exoskeleton thereto;

FIG. 5 is a view of the spindle facing surface of a non-drive side ("slave") crank of the present invention;

FIG. 6 is a sectional view taken along lines 6—6 of FIG. 5;

FIG. 7 is an exploded view of the spindle facing surface of the lug and foam core component of the non-drive side crank of the present invention, prior to the addition of the carbon fiber exoskeleton;

FIG. 8 is a view of the spindle facing surface of an alternate embodiment drive side crank of the present invention;

FIG. 9 is an exploded view of the spindle facing surface of the alternate embodiment drive side crank shown in FIG. 8, wherein prior to the addition of the carbon fiber exoskeleton thereto;

FIG. 10 is a sectional view taken generally along lines 10—10 of FIG. 9;

VI. DETAILED DESCRIPTION

Figure 12:
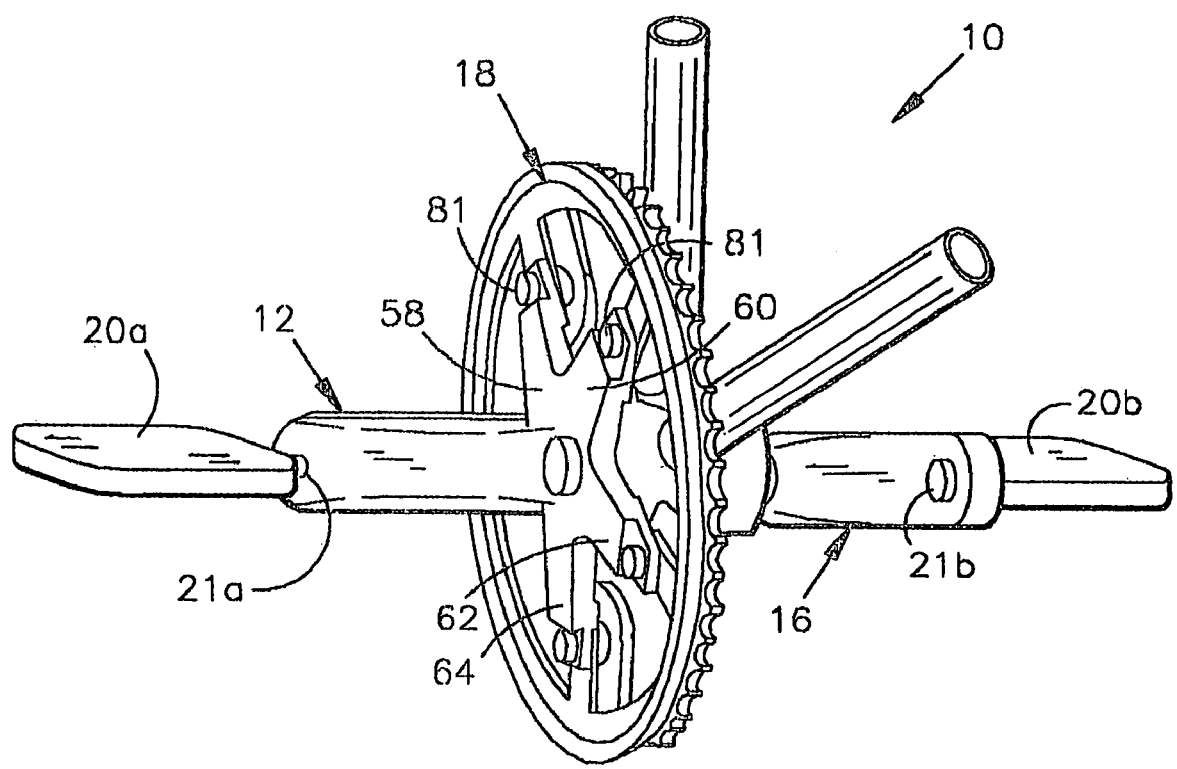
FIG. 12 is a perspective view of the crank arm assembly of the present invention as attached to a bicycle (partially broken away).

Referring first to FIG. 12, a bicycle 10 is shown with both a drive side crank 12 and a non drive side (slave) crank 16 of the present invention assembled thereto. Each crank 12, 16 is fixedly attached to the bottom bracket spindle axle (not shown) which is rotatably journaled in the bottom bracket spindle housing 14. The chain drive sprocket, (chain ring) 18 is fixedly attached to drive side crank 12 for rotation about an axis defined by the bottom bracket spindle. The pedals 20a, 20b are rotatably coupled to the distal end 22 of crank 12, 14 by a bearing assembly containing pedal coupling axle rods 21a, 21b, to permit the pedals to rotate about an axis defined by the respective pedal coupling rods 21a, 21b. Drive side crank 12 and non-drive side crank 14 rotate about the axis of rotation of the bottom bracket spindle (not shown) during a pedal stroke. This rotation results in a rotation of chain ring 18 about the same spindle axis which in turn rotates the rear wheel of the bicycle (not shown) about its axis through the engagement of the chain (not shown) with a rear wheel sprocket (not shown). The mechanics of the bicycle drive train is well known in the art.

Figure 1:
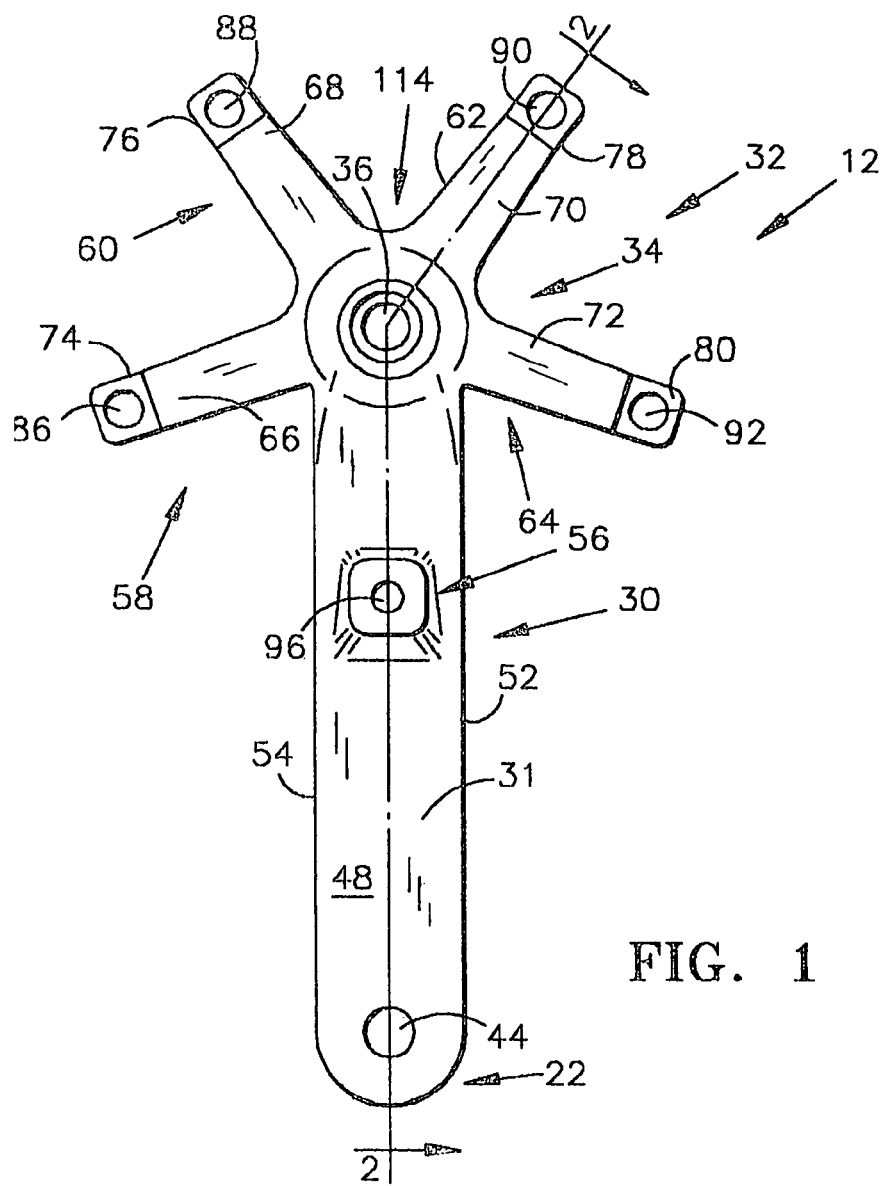
FIG. 1 is a view of the spindle facing surface of a drive side crank arm of the present invention.
Figure 2:
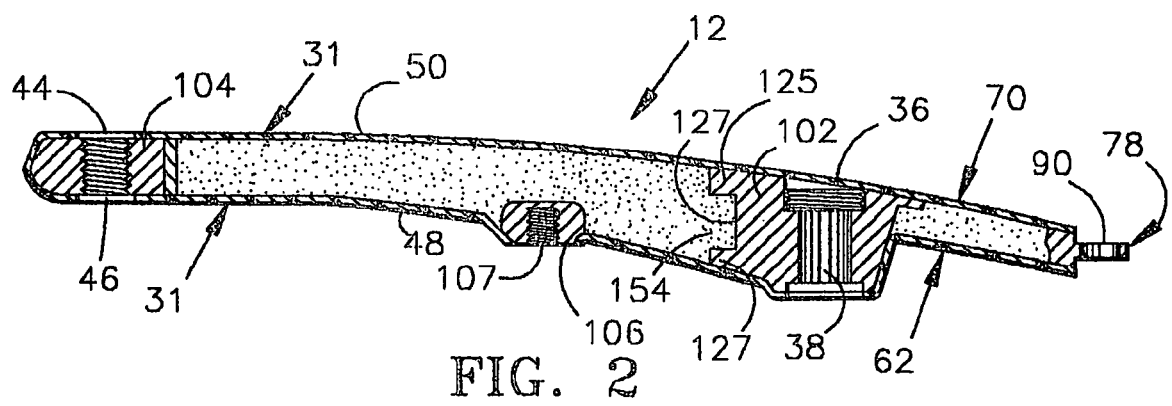
FIG. 2 is a sectional view taken generally along lines 2—2 of FIG. 1.

Turning now to FIGS. 1 and 2, the drive side crank 12 is shown as having a generally ovaloid-shaped main body portion 30 that is almost completely covered by a carbon fiber composite material exoskeleton 31 that provides the main load and force bearing component of the crank 12. The main body portion 30 has a proximal end 32 that is attached to the spindle (not shown) of the bicycle, and a distal end 22 to which the drive side pedal 20a (FIG. 12) is attached. The proximal end 32 includes a spider portion 34 for engaging the chain ring 18 (FIG. 12) of the bicycle, and a spindle axle bore 36 for receiving the main crank spindle. Preferably, the spindle axle bore 36 includes a plurality of splines 38 for engaging the matingly splined spindle axle, so the rotary force imparted to that crank will turn the spindle axle (not shown) to thereby help turn the non-drive side crank 16. A pedal axle bore 40 is threaded for threadedly receiving the pedal axle rod 21a at the drive side pedal 20a (FIG. 12). The size, shape and configuration of the splines 38 and threads 46 of the spindle axle bore 36 and pedal axle bore 44, respectively should be designed to accommodate both standard splines and standard pedal axle rods, respectively.

Drive side crank 12 includes four major surface areas, including a spindle facing (inside) surface 48, a pedal facing (outside) surface 50, a leading edge 52 and a trailing edge 54. The pedal facing surface 50 of the crank 12 faces outward from the bicycle 10, and the spindle facing surface 48 faces inwardly, toward the frame of the bicycle, and toward the main spindle (not shown). The leading edge 52 is designated as such, because this is the edge that leads the crank when the drive side crank 12 is placed on the right side of the bicycle, and the crank 12 and pedal 20a are engaged in a power stroke. Similarly, when these conditions occur, the trailing edge 54 will be in a trailing position.

The proximal portion 32 of the drive side cranks includes first 58, second 60, third 62 and fourth 64 radially extending arms. The four radially extending arms 58, 60, 62, 64, when coupled with the fifth hole member 56, comprise five points at which the chain ring 18 can be attached, each of which is spaced from its adjacent member by approximately 72 degrees, so that the five points of attachment are equally spaced around the periphery of the chain ring 18.

Each of the first, second, third and fourth radially extending arms 58, 60, 62, 64 include, respectively, a carbon fiber covered portion 66, 68, 70, 72, and an exposed metal distal end 74, 76, 78, 80. Each of the exposed metal distal ends 74–80 includes a chain ring engaging aperture 86, 88, 90, 92 respectively, through which a fastener, such as a bolt and nut 81 (FIG. 12) can be passed for fixedly coupling the respective radially extending arms 58, 60, 62, 64, to corresponding coupling apertures (not shown) on the chain ring 18. The fifth hole member 56 also includes a fifth hole aperture 96 that is threaded, for receiving a threaded bolt-type connecting member (not shown) for connecting the chain ring to the fifth hole member 56.

Turning now to FIG. 3, the drive side crank 12 includes three primary metal components that form the metallic core of the drive side crank 12. These three components include an axle lug 102, a pedal lug 104, and a fifth hole lug 106. The axle lug 102, pedal lug 104 and fifth hole lug 106 are made preferably made from a light-weight, yet strong metal, such as aluminum. The use of metal for these components is preferred (as compared to carbon fiber, since these components, and the finished drive side crank 12, include an axle 36 bore that engage spindle axle, a pedal axle bore 44 that engages a pedal rod 21a and chain ring fastener apertures 86, 88, 90, 92 that engage chain ring connectors 81. Due to the forces and stresses placed on these parts, the applicants have found that a metal-to-metal engagement between the various axles and bore provides superior performance, when compared to carbon fiber-to-metal connections.

FIG. 3 shows the axle lug 102, pedal lug 104, and fifth hole lug 106 in their raw, or un-machined state. For example, it will be noted that the axle lug 102 does not include either an axle bore or chain ring engaging apertures. Similarly, the pedal lug 104 does not include a pedal bore, and the fifth hole lug 106 does not include a fifth hole bore. As will be explained in more detail below, the various bores are machined into the metal parts after the application of the carbon fiber exoskeleton 31.

The axle lug 104 includes central portion 108 having a circular shaped central plateau 110, that is surrounded by a sloping perimeteral portion 112 and a spider portion 114. The spider portion 114 includes four radially extending arms 58, 60, 62, 64 extend radially outwardly from the central portion 108. Each of the radially extending arms 58, 60, 62, 64 includes a radially extending slotted aperture 116, 118, 120, 122 respectively.

The slotted apertures 116–122 serve two primary purposes. First, the slotted apertures reduce the weight of the axle lug 102, due to the absence of metal therein. Second, the apertures provide a space into which foam can be placed for providing an appropriate form to the axle lug 102, at a greatly reduced weight, when compared to a solid metal part. As the carbon fiber exoskeleton is designed to absorb most of the forces applied to the drive side crank 12, the absence of metal in the radially extending arm 58–64, caused by the removal of metal to form the slotted apertures 116–122 does not materially impact the strength of the drive side crank 12, or the spider portion thereof. The pedal lug 104 includes a generally planar proximal surface 124 and a semi-circular surface 126. Generally, the shape and size of the exterior surface 128 of the pedal lug 104 is similar to the distal end of the distal end of the finished drive side crank 12, as is best shown in FIG. 2.

The shape of the axle lug 102 is governed largely by the final shape of the drive side crank 12, as the carbon fiber exoskeleton 31 is molded over the surfaces of the axle lug 102 and takes on a final shape that is very similar to the exterior shape of axle lug 102.

The distal end of the axle lug 102 includes a pair of downwardly extending legs 123, 125 that define therebetween a cavity 127. The inclusion of a cavity 127 serves two purposes. First, by removing some of the aluminum of the axle lug 102, it reduces its weight. Second, the cavity provides additional surface area contact between the axle lug 102 and the foam core 130, to better couple the two after the molding process as will be described in more detail below.

Figure 11:
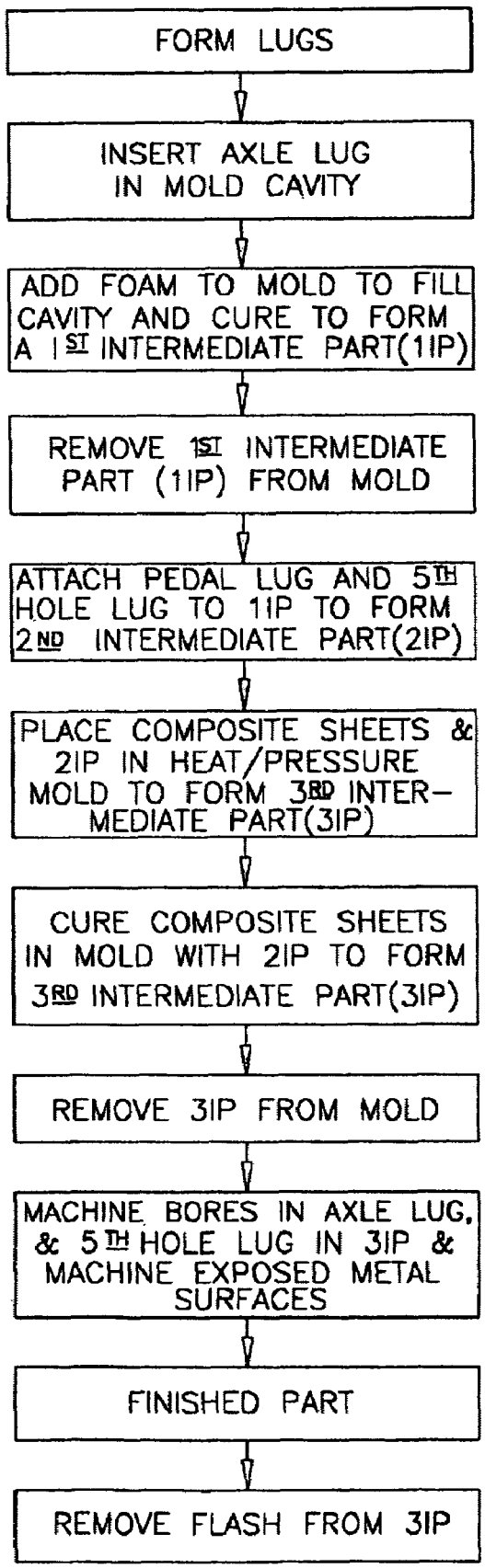
FIG. 11 is a flow chart illustrating the various steps of the process of the present invention.

Turning now to FIGS. 3 and 4, the internal components of the drive side bicycle crank 12 will be described, along with its manufacturing process. Turning first to FIG. 11, a flow chart is provided that shows the process by which the drive side crank is manufactured. The first step in the process is to form the three metal lugs that are used in the drive crank, including axle lug 102, a pedal lug 104, and a fifth hold lug 106.

The pedal lug 104 includes a generally proximal planar surface 124, and a semi-circular distal surface 126, having parallel sides adjacent to the proximal planar surface 124. The pedal lug 104 is generally pill-shaped, and a side profile can best be seen with reference to FIG. 2. The fifth hole lug 106 is generally shaped like a rectangular pill, having a generally planar upper and lower surface, with rounded edges.

Returning now to FIG. 11, the second step in the process is to insert the axle lug 102 into a mold cavity. Preferably, the mold cavity is designed to accommodate the axle lug 102, and an empty space, into which the to-be-formed foam core can be formed. After the axle lug 102 is placed in the mold cavity, the mold is filled with a lightweight, inexpensive polyurethane foam, to form a foam core 130, as shown in FIG. 4. The foam core 130 includes a main body portion 132 having a recessed divot 134 on the spline facing surface 135 of the main body portion 132. The recessed divot 134 is formed by a male protrusion in the generally female mold die into which the axle lug 102 is placed.

The foam core 130 also includes aperture filling portions 136, 138, 140 and 142, disposed in the radially extending slot-like apertures 116, 118, 120, 122 that are formed in the axle lug 102. The foam core 130, when cured, has a generally planar distal end 146.

Returning to FIG. 11, after foam is added to the mold cavity to fill the mold cavity, the foam is cured to form the foam core 130 discussed above. When the polyurethane foam is cured, it forms a generally solid, but rather lightweight member.

When choosing a foam for the foam core 130, it is not necessary to employ a foam that will have a great deal of structural strength, since in the finished drive crank 12, the foam core 130 plays little role in the structural integrity of the drive side crank 12. Rather, the carbon fiber exoskeleton and the various lugs are designed to take most of the force and stresses exerted upon the drive side crank 12. However, the final foam core must have sufficient structural rigidity, and temperature stability to enable the carbon fiber exoskeleton to be formed over it, as the foam core 130 serves as a template, for giving shape to the carbon fiber exoskeleton 31.

After the polyurethane foam that comprises the foam core 130 is fully cured, this "first intermediate part" so formed is removed from the mold die.

The next step in the procedure is that the pedal lug 104 is coupled to the first intermediate part. To couple the pedal lug 104 to the foam core 130 of the first intermediate part, an adhesive strip 148 having a first adhesive surface 150 and a second adhesive surface 152 is interposed between the planar surface 124 of the pedal lug 104 and the planar distal end surface 146 of the foam core. The adhesive on the adhesive surfaces 150, 152 adhesively and mechanically couples the pedal lug 104 and foam core 130 together. Additionally, at about the same time, the fifth hole lug 106 is inserted into the recessed divot 134 that is formed on the spline facing surface 135 of the main body 132 of the foam core 130. Although the shape of the divot 134 is designed to fixedly capture the fifth hole lug 106, an adhesive may be applied, if desired, to better maintain the fifth hole lug 106 in its proper orientation with recessed divot 134.

When the pedal lug 104 and fifth hole lug 106 are coupled to the first intermediate part, an intermediate part herein designated as the "second intermediate part" is formed.

Continuing onward with FIG. 11, the next step in the process is that the second intermediate part is placed in a heat and pressure mold, along with the sheets of the uncured carbon fiber composite material. Preferably, a sheet is placed above the second intermediate part, and a second sheet below the second intermediate part, to form a "sandwich" where the carbon fiber sheets comprise the "bread" and the second intermediate part consisting of the foam core and the lugs comprises the "meat".

While this application speaks to a first and second sheet of carbon fiber material, each of the "sheets" may be composed of several layers of carbon fiber material. For example, each of the sheets can be comprised of several layers of unidirectional, continuous carbon fiber laminates. The direction of the fibers within the laminates can be chosen to counter the deflections and forces that the drive side crank arm 12 will experience during a pedal stroke. Additionally, the outer layer or skin of the carbon fiber sheet can comprise a carbon fiber twill laminate that consists of continuous carbon fibers oriented in multiple directions. This multiple direction orientation makes the twill laminate harder to penetrate that the unidirectional laminate. As such, the twill laminate makes a better, more damage resistant skin for the drive side crank arm 12 than the unidirectional laminate.

One method for making the carbon fiber sheet/lug and core/fiber sheet sandwich discussed above, is to wrap the second intermediate part with the composite sheets, before placement of the second intermediate part in the mold.

In any event, the carbon fiber composite sheets and the second intermediate part are placed in the mold, (which mold is different from the mold in which the foam is added) to form a third intermediate part. This third intermediate part is formed by the application of heat and pressure to the mold. This heat and pressure serves two primary purposes. The first is to cure the uncured carbon fiber composite into a hardened carbon fiber laminate of the type that will have the desired strength and appearance characteristics. The second purpose is to tightly form the carbon fiber composite sheets against the exterior surface of the various lugs and foam core 130, so that, in a manner similar to that one would achieve in a vacuum-forming process, the exterior shape of the carbon fiber composite exoskeleton 31 and hence, the shape of the exterior surface of the drive crank 12, will be generally similar (but larger) than the exterior surface of the second intermediate part.

As alluded to above, the curing of the composite sheets leads to the creation of a third intermediate part, which is then removed from the mold. After this "third intermediate part" is removed from the mold, the part is run through several finishing operations in order to produce the finished part.

One such finishing operation is a machining operation to machine the appropriate bores including the spindle (axle) bore 36, the pedal axle bore 44, and the fifth hole lug bore 107 into the respective axle lug 102, pedal lug 104 and fifth hole lug 106. As is best shown in FIG. 2, the axle bore 36 comprises a splined bore, for receiving a splined spindle axle. If desired, the pedal facing end of the bore 36 may include threads, to which a nut or cap may be affixed. The pedal bore 44 is machined to be threaded to accept a threaded pedal rod. Similarly, the connector receiving bore 107 of the fifth hole lug 106 is also threaded to receive the threaded chain ring connector.

In addition to the three bores discussed above, chain ring engaging apertures 86, 88, 90, 92 are machined through the distal ends 74, 76, 78, 80 of the radially extending arms 58, 60, 62, 64 respectively. Finally, the exposed metal distal ends 74, 76, 78, 80 of the radial arms are surface-machined, so that the surfaces have a shiny appearance, and so that distal ends are dimensioned properly for being received by the chain ring of the bicycle.

The final step in the process is to remove any "flash" from the third intermediate part. As will appreciated, the placement of the carbon fiber composite sheets around the second intermediate part, and the placement of these materials within a mold, will likely leave excess material (flash) in certain areas of the part, especially along the line where the two sheets are joined. This flash must be trimmed off, before shipment to the customer so that the part has an acceptable appearance to the consumer.

Turning now to FIGS. 5 and 6, the non-drive side ("slave") crank 16 is shown as having a generally ovaloid-shaped (in cross-section) main body portion 166 that is almost completely covered by a carbon fiber composite material exoskeleton 164 that provides the main load and force bearing component of the slave crank 16. The main body portion 166 includes a proximal end 168 that is attached to the spindle (not shown) of the bicycle, and a distal end 174 to which the non-drive side pedal 20*b* (FIG. 1) is attached.

The proximal end 168 does not include a spider portion for engaging the chain ring 18 (FIG. 1) of the bicycle as the slave side crank 16 does not engage the chain ring. However, the proximal end portion 168 does include a spindle axle bore 170 for receiving the main crank spindle. Preferably, the spindle axle bore 170 includes a plurality of splines 172 for engaging the matingly splined spline axle, so that the rotary force imparted to that slave crank 16 will turn the spindle axle to thereby help turn the drive side crank 12, and hence, the chain ring 18.

A threaded pedal axle bore 178 threadedly receives the pedal axle rod 21*b* of the non-drive side pedal 20*b* (FIG. 1). The size, shape and configuration of the splines 172 and threads of the spindle axle bore 170 and pedal axle bore 178, respectively should be designed to accommodate both standard splines and standard pedal axle rods, respectively.

Non-drive side crank 16 includes four major surface areas, including a spindle facing (inside) surface 182, a pedal facing (outward) surface 184, a leading edge 186 and a trailing edge 188. The pedal facing surface 184 of the crank arm 16 faces outward from the bicycle 10, and the spindle facing surface 182 faces inwardly, toward the frame of the bicycle, and toward the main spindle. The leading edge 186 is designated as such, because this is the edge that leads the slave crank 16 during such times as the slave crank 16 is placed on the left side of the bicycle, and the slave crank 16 and pedal 20*b* are engaged in a power stroke to propel the bicycle forwardly. Similarly, when these conditions occur, the trailing edge 188 will be in a trailing position.

As best shown in FIG. 7, the slave crank 16 includes two primary metal components, that form the metallic core of the slave crank 16. These two components include an axle lug 194 and a pedal lug 196. The axle lug 194 and pedal lug 196 are made preferably from a light-weight, yet strong metal, such as aluminum. It has been found by applicants that the use of metal for these components is preferred (as compared to strictly carbon fiber) since these components, and the finished slave crank 16, include an axle bore 170 that engages the spindle axle and a pedal bore 178 that engages the pedal axle. Due to the forces and stresses placed on the parts, the applicants have found that a metal-to-metal engagement between the various axles and the bores 170, 178 provides superior performance, when compared to carbon fiber-to-metal connections.

FIG. 7 shows the axle lug 194 and pedal lug 196 in their raw, or un-machined state. For example, it will be noted that the axle lug 194 does not include an axle bore, nor does the pedal lug 196 include a pedal bore. As was explained in connection with drive side crank 12, the various bores are machined into the metal parts after the application of the carbon fiber exoskeleton 164.

The axle lug 194 includes a central portion 198 that includes a circular disk shaped central plateau portion 200, that is surrounded by a sloping perimeteral portion 202. The distal end of the axle lug 194 includes a pair of downwardly extending legs 204, 206 that define a cavity 210 therebetween. The inclusion of a cavity 210 serves two purposes. First, by removing some of the aluminum of the axle lug 194, the weight of axle lug 194 is reduced. Second, the cavity 210 provides additional surface area contact between the axle lug 194 and the foam core 230, to better couple the two after the initial molding process as will be described in more detail below.

The shapes of the axle lug 194 and pedal lug 196 are governed largely by the final shape of the slave side crank 16, as the carbon fiber exoskeleton 164 is molded over the surfaces of the axle lug 194 and pedal lug 196 and pedal lug 196, and takes on a final shape that is very similar to the exterior shape of axle lug 194 and pedal lug 196. The pedal lug 196 includes a generally planar proximal surface 212, and a semi-circular distal surface 214, having parallel sides adjacent to the proximal surface 212. The pedal lug 196 is generally pill-shaped, and a side profile can best be seen with reference to FIG. 6.

During manufacture, the raw axle lug 194 is placed in a mold cavity, and the mold is filled with a lightweight, inexpensive polyurethane foam, to form a foam core 230, as shown in FIG. 7. The foam core 230 includes a main body portion 232. It should be noted, that unlike the drive side crank 12, in the slave crank 16, the spline facing surface 235 of the main body portion 232 contains no recessed divot.

After foam is added to the mold cavity to fill the mold cavity, the foam is cured to form the foam core 230 discussed above. The foam core 230, when cured, has a generally planar distal end 246. After the polyurethane foam that comprises the foam core 130 is fully cured, the first intermediate part of the slave side crank 16 is removed from the mold die.

The pedal lug 196 is coupled to the first intermediate part, which, for purposes of this discussion, comprises the axle lug/foam core combination shown in FIG. 6. To couple the pedal lug 196 to the foam core 230 of the first intermediate part, an adhesive strip 248 having a first adhesive surface 250 and a second adhesive surface 252 is interposed between the planar surface 212 of the pedal lug 196 and the planar distal end surface 246 of the foam core 230. The adhesive on the adhesive surfaces 250, 252 adhesively and mechanically couples the pedal lug 196 and foam core 230 together.

Similar to the manner in which the drive side crank is manufactured, the next step in the process is that the second intermediate part (the two lugs 194, 196 and foam core 230) is placed in a heat and pressure mold, along with the sheets of the carbon fiber composite material. Preferably, the carbon fiber composite sheets are in their uncured state, wherein a sheet is placed above the second intermediate part, and a second sheet below the second intermediate part, to form a "sandwich" where the carbon fiber sheets comprise the "bread" and the second intermediate part comprises the "meat".

The carbon fiber composite sheets and the second intermediate part are placed in the mold, (different from the mold in which the foam is added) to form a third intermediate part. This third intermediate part is formed by the application of heat and pressure to the mold which cures the uncured carbon fiber composite into a hardened carbon fiber laminate exoskeleton of the type that will have the desired strength and appearance characteristics, and which also tightly forms the carbon fiber composite sheets against the exterior surface of the various lugs 194, 196 and foam core 230, so that, in a manner similar to that one would achieve in a vacuum-forming process, the exterior shape of the carbon fiber composite exoskeleton 164 and hence, the shape of the exterior surface of the slave crank 16, turns out to be generally similar (but larger) than the exterior surface of the second intermediate part.

As alluded to above, the curing of the composite sheets leads to the creation of a third intermediate part, which is then removed from the mold. After this "third intermediate part" is removed from the mold, the part is run through several finishing operations in order to produce the finished part. As with the drive side crank 16, these finishing operation include machining the appropriate bores 170, 178 into the respective axle lug 194 and pedal lug 196; and any "flash" is removed to form a final part.

Turning now to FIGS. 8–10, an alternate embodiment drive side crank 312 is shown as having a generally ovaloid-shaped main body portion 330 that is almost completely covered by a carbon fiber composite material exoskeleton 331 that provides the main load and force bearing component of the crank 312. The main body portion 330 has a proximal end 332 that is attached to the spindle (not shown) of the bicycle, and a distal end 322 to which a drive side pedal (e.g. pedal 20a of FIG. 12) is attached. The proximal end 332 includes a spider portion 334 for engaging a chain ring (e.g. chain ring 118 of FIG. 12) of the bicycle, and a spindle axle bore 36 for receiving the main crank spindle. Preferably, the spindle axle bore 336 includes a plurality of splines, similar to spline 38 (FIG. 1) for engaging the matingly splined spindle axle, so the rotary force imparted to the crank will turn the spindle axle (not shown) to thereby help turn a non-drive side crank such as is shown in FIG. 5. A pedal axle bore 440 is threaded for threadedly receiving a pedal axle rod at the drive side pedal. The size, shape and configuration of the splines 338 and threads of the spindle axle bore 336 and pedal axle bore 344, respectively should be designed to accommodate both standard splines and standard pedal axle rods, respectively.

Drive side crank 312 includes four major surface areas, including a spindle facing (inside) surface 348, a pedal facing (outside) surface (not shown), a leading edge 352 and a trailing edge 354. The pedal facing surface of the crank 312 faces outward from the bicycle 10, and the spindle facing surface 348 faces inwardly, toward the frame of the bicycle, and toward the main spindle (not shown). The leading edge 352 is designated as such, because this is the edge that leads the crank when the drive side crank 312 is placed on the right side of the bicycle, and the crank 312 and pedal are engaged in a power stroke. Similarly, when these conditions occur, the trailing edge 354 will be in a trailing position.

The proximal portion 332 of the drive side cranks includes first 358, second 360, third 362, fourth 364 and fifth 365 radially extending arms which differs from the four radial arms of crank 12 of FIG. 1 in number and placement, but which are generally similar in individual configuration. The five radially extending arms 358, 360, 362, 364, comprise five points at which the chain ring 18 can be attached, each of which is spaced from its adjacent member by approximately 72 degrees, so that the five points of attachment are equally spaced around the periphery of the chain ring 18.

Each of the first-fifth radially extending arms 358, 360, 362, 364, 365 include, respectively, a carbon fiber covered portion 366, 368, 370, 372, 373 and an exposed metal distal end 374, 376, 378, 380, 381. Each of the exposed metal distal ends 374–381 includes a chain ring engaging aperture 386, 388, 390, 392, 393 respectively, through which a fastener, such as a bolt and nut 81 (FIG. 12) can be passed for fixedly coupling the respective radially extending arms 358–365, to corresponding coupling apertures (not shown) on the chain ring 18.

Turning now to FIG. 3, the drive side crank 312 includes two primary metal components that form the metallic core of the drive side crank 312, including an axle lug 402, and a pedal lug 404. No fifth hole lug is present since there are five radial arms to provide five connector points. The axle lug 402, and pedal lug 404 are preferably made from the same light-weight, strong aluminum as their corresponding lugs in the other embodiments.

FIG. 9 shows the axle lug 402 and pedal lug 404 in their raw, or un-machined state. The axle lug 404 includes central portion 408 having a circular shaped central plateau 410, that is surrounded by a sloping perimeteral portion 412. The five radially extending arms 358–365 extend radially outwardly from the central portion 308. Each of the radially extending arms 358–365 includes a radially extending slotted aperture (e.g. 369 in FIG. 10) that is generally similar in size, shape and configuration to the slotted apertures 116, 118, 120, 122, shown in FIG. 3. The pedal lug 404 includes a generally planar proximal surface 424 and a semi-circular surface 426.

The shapes of the axle lug 402 and pedal lug 404 are governed largely by the final shape of the drive side crank 412, as the carbon fiber exoskeleton 431 is molded over the surfaces of the axle lug 402, pedal lug 404 and takes on a final shape that is very similar to the exterior shape of axle lug 402, and pedal lug 404.

The distal end of the axle lug 402 includes a pair of downwardly extending legs (not shown) that define therebetween a cavity (not shown) that is virtually identical to cavity 427 of FIG. 2.

The foam core 430 includes a main body portion 432, aperture filling portions (e.g. 471 of FIG. 10) disposed in the radially extending slot-like apertures that are formed in the axle lug 402. The foam core 430, when cured, has a generally planar distal end 446.

The pedal lug 404 is coupled to the first intermediate part (see FIG. 9), though an adhesive strip 448 having a first adhesive surface 450 and a second adhesive surface 452 which is interposed between the planar proximal surface 424 of the pedal lug 404 and the planar distal end surface 446 of the foam core. The adhesive on the adhesive surfaces 450, 452 adhesively and mechanically couples the pedal lug 404 and foam core 430 together.

Generally, the alternate embodiment drive side crank 312 is manufactured in a manner similar to that in which the drive side crank 12 is manufactured, expect that there is no need to accommodate processes or steps specific to the fifth hole or lug. However, there is a need to accommodate the fifth radial arm of the alternate embodiment crank 312.

Although the invention has been described with reference to certain preferred embodiments thereof, the invention is intended not to be limited by the foregoing description, but rather, to encompass all inventions contained within the scope and sphere of the claims set forth below.

What is claimed is:

1. A carbon fiber bicycle crank arm comprising
   (a) an axle lug including a portion for receiving a crank axle, wherein the axle lug includes a spider portion, the spider portion comprising at least one radially extending endoskeletal arm having a distal end capable of being coupled to a chain ring, the radially extending arm including an aperture
   (b) a foam core coupled to the axle lug during a first molding process
   (c) a pedal engaging lug coupled to the foam core after the completion of the first molding process; and
   (d) a carbon fiber composite material exoskeleton coupled to and disposed exteriorly of at least a portion of the axle lug, radially extending endoskeletal arm, foam core and pedal lug,
   wherein the foam core includes a portion disposed within the aperture of the radially extending arm.

2. The carbon fiber bicycle crank arm of claim 1 wherein the carbon fiber composite material exoskeleton comprises a first sheet-like skin member and a second sheet-like skin member, the first and second skin members being formed into a unitary exoskeleton in a second molding process.

3. The carbon fiber bicycle crank arm of claim 1 wherein the axle lug, foam core and pedal engaging lug create a form for defining the shape of the carbon fiber composite material exoskeleton placed there over.

4. The carbon fiber bicycle crank of claim 1 wherein the foam core includes a generally non-hollow rod portion extending between the pedal engaging lug and the axle lug.

5. The carbon fiber bicycle crank of claim 4 further comprising a ring engaging lug, wherein the rod portion of the foam core includes a recessed portion for receiving the ring engaging lug.

6. The carbon fiber bicycle crank arm of claim 1 further comprising an adhesive member for adhesively coupling the pedal engaging lug to the foam core.

7. The carbon fiber bicycle crank arm of claim 1 further comprising a ring engaging lug disposed exteriorly of the foam core and interiorly of carbon fiber material exoskeleton, the ring engaging lug being capable of being coupled to a chain ring.

8. The carbon fiber bicycle crank arm of claim 7 wherein the spider portion includes at least four radially extending aperture containing arms, and the foam core includes a portion disposed within the apertures of each radially extending arm.

9. The carbon fiber bicycle crank arm of claim 8 wherein the form core includes a recessed portion for receiving the ring engaging lug after completion of the formation of the foam core.

10. The carbon fiber bicycle crank arm of claim 7 further comprising an adhesive member for adhesively coupling the pedal engaging lug to the foam core.

11. A carbon fiber bicycle crank arm comprising
    (a) an axle lug including a portion for receiving a crank axle, the axle lug includes a spider portion comprising at least one radially extending arm,
    (b) a foam core coupled to the axle lug during a first molding process the foam core engages a portion of the radially extending arm
    (c) a pedal engaging lug coupled to the foam core after the completion of the first molding process; and
    (d) a carbon fiber composite material exoskeleton coupled to and disposed exteriorly of axle lug, foam core, radially extending arm and pedal lug,
    wherein the radially extending arm includes a slotted aperture extending along at least one half of the length of the radially extending arm, and the foam core includes a portion disposed within the slotted aperture.

* * * * *